US012724517B2

(12) United States Patent
Abe et al.

(10) Patent No.: US 12,724,517 B2
(45) Date of Patent: Sep. 1, 2026

(54) SUBSTRATE-BOUND ADHEREND

(71) Applicant: Panasonic Intellectual Property Management Co., Ltd., Kadoma (JP)

(72) Inventors: Takuto Abe, Osaka (JP); Keishu Muraoka, Osaka (JP); Kota Araki, Osaka (JP); Takeshi Haritani, Hyogo (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 0 days.

(21) Appl. No.: 18/994,804

(22) PCT Filed: Jun. 15, 2023

(86) PCT No.: PCT/JP2023/022248
§ 371 (c)(1),
(2) Date: Jan. 15, 2025

(87) PCT Pub. No.: WO2024/024318
PCT Pub. Date: Feb. 1, 2024

(65) Prior Publication Data

US 2026/0016920 A1 Jan. 15, 2026

(30) Foreign Application Priority Data

Jul. 26, 2022 (JP) ................................ 2022-118987

(51) Int. Cl.
*G06F 3/044* (2006.01)

(52) U.S. Cl.
CPC .. *G06F 3/0443* (2019.05); *G06F 2203/04107* (2013.01)

(58) Field of Classification Search
CPC ..................................................... G06F 3/0443
See application file for complete search history.

(56) References Cited

U.S. PATENT DOCUMENTS

2009/0022925 A1* 1/2009 Yamanaka ............. C09J 133/04 428/41.3
2010/0316851 A1* 12/2010 Hirai ..................... G06F 3/0446 427/58

(Continued)

FOREIGN PATENT DOCUMENTS

JP 2005-014141 A 1/2005
JP 2009-084510 A 4/2009

(Continued)

OTHER PUBLICATIONS

International Search Report dated Sep. 5, 2023, issued in counterpart International Application No. PCT/JP2023/022248 (4 pages).

*Primary Examiner* — Chun-Nan Lin
(74) *Attorney, Agent, or Firm* — WHDA, LLP

(57) ABSTRACT

An adherend-equipped substrate includes a substrate and an adherend. The adherend is bonded to a front face of the substrate with the adhesive. The substrate includes a substrate body and a protective layer. The protective layer having a front face is disposed at a side of a front face of the substrate body. The front face of the protective layer has a first region and a second region. The first region is a region to which the adherend is bonded with the adhesive. The first region has a first contact angle. The second region is a region other than the first region and has a second contact angle. The first contact angle is smaller than the second contact angle.

11 Claims, 12 Drawing Sheets

(56) References Cited

U.S. PATENT DOCUMENTS

| | | | | |
|---|---|---|---|---|
| 2012/0315476 | A1* | 12/2012 | Ogawa | C09J 7/385<br>428/355 R |
| 2020/0118963 | A1 | 4/2020 | Hirota et al. | |
| 2021/0327846 | A1 | 10/2021 | Hirota et al. | |
| 2023/0305648 | A1* | 9/2023 | Araki | H01H 19/11 |

FOREIGN PATENT DOCUMENTS

| | | | |
|---|---|---|---|
| JP | 2018-048061 | A | 3/2018 |
| JP | 2020-061511 | A | 4/2020 |
| WO | 2021/210240 | A1 | 10/2021 |

* cited by examiner

6
Y1
Y1
Y1
Y1
62s
62
66
X1
X1
61s
61
63

SUBSTRATE-BOUND ADHEREND

CROSS REFERENCE TO RELATED APPLICATIONS

This Application is the National Stage of International Application No. PCT/JP2023/022248, filed on Jun. 15, 2023, which claims priority from Application No. 2022-118987 filed on Jul. 26, 2022 in Japan. The entire contents of these applications are incorporated herein by reference in their entirety.

TECHNICAL FIELD

The present disclosure relates to adherend-equipped substrates and more specifically relates to an adherend-equipped substrate including a substrate to which an adherend is bonded with an adhesive.

BACKGROUND ART

Patent Literature 1 describes a glass article (an adherend-equipped substrate) including a glass substrate (a substrate body), a soil-resistant layer (a protective layer) formed on a first principal surface (a front face) of the glass substrate, and a member (an adherend) bonded to the soil-resistant layer with an adhesive. The soil-resistant layer is selectively removed by laser irradiation, and at a removed portion from which the soil-resistant layer has been removed, the glass substrate which is a layer underlying the soil-resistant layer is exposed through the soil-resistant layer. The member is bonded to the removed portion of the protective layer (the portion at which the layer underlying the protective layer is exposed) with the adhesive.

In the case of the glass article described above, when the layer underlying the soil-resistant layer is exposed at the removed portion of the soil-resistant layer by the laser irradiation, the layer underlying the soil-resistant layer may be cut by the laser irradiation, which may deteriorate a function of the layer underlying the soil-resistant layer. To avoid the deterioration of the function, the member may be bonded to a front face of the soil-resistant layer with the adhesive without removing the soil-resistant layer. In this case, a large number of local air layers are mixed in an adhesive layer formed from the adhesive when the adhesive is applied to the front face of the protective layer because the front face of the soil-resistant layer generally has a large contact angle. As a result, the member cannot be firmly bonded to the front face of the soil-resistant layer with the adhesive.

CITATION LIST

Patent Literature

Patent Literature 1: JP 2018-048061 A

SUMMARY OF INVENTION

It is an object of the present disclosure to provide an adherend-equipped substrate configured to allow an adherend to be firmly bonded to a front face of a protective layer with an adhesive.

An adherend-equipped substrate of an aspect of the present disclosure includes a substrate and an adherend. The adherend is bonded to a front face of the substrate with an adhesive. The substrate includes a substrate body and a protective layer. The protective layer having a front face is disposed at a side of a front face of the substrate body. The front face of the protective layer includes a first region and a second region. The first region is a region to which the adherend is bonded with the adhesive. The first region has a first contact angle. The second region is a region other than the first region and has a second contact angle. The first contact angle is smaller than the second contact angle.

DESCRIPTION OF EMBODIMENTS

An adherend-equipped substrate of an embodiment of the present disclosure will be described with reference to the drawings. Figures described in the following embodiment are schematic views. The ratio of sizes and the ratio of thicknesses of components in the figures do not necessarily reflect actual dimensional ratios.

(1) Overview

Figure 1:
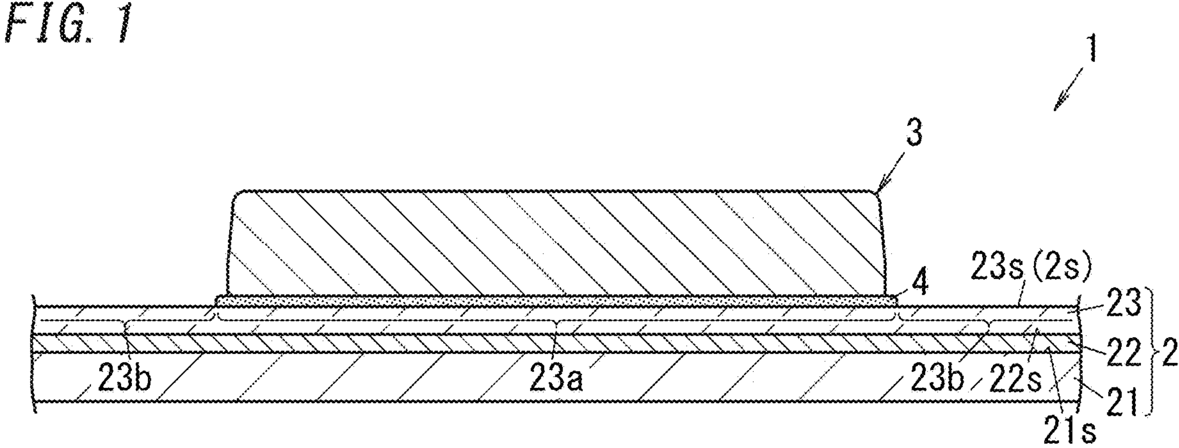
FIG. 1 is a sectional view of an adherend-equipped substrate according to an embodiment.
Figure 2:
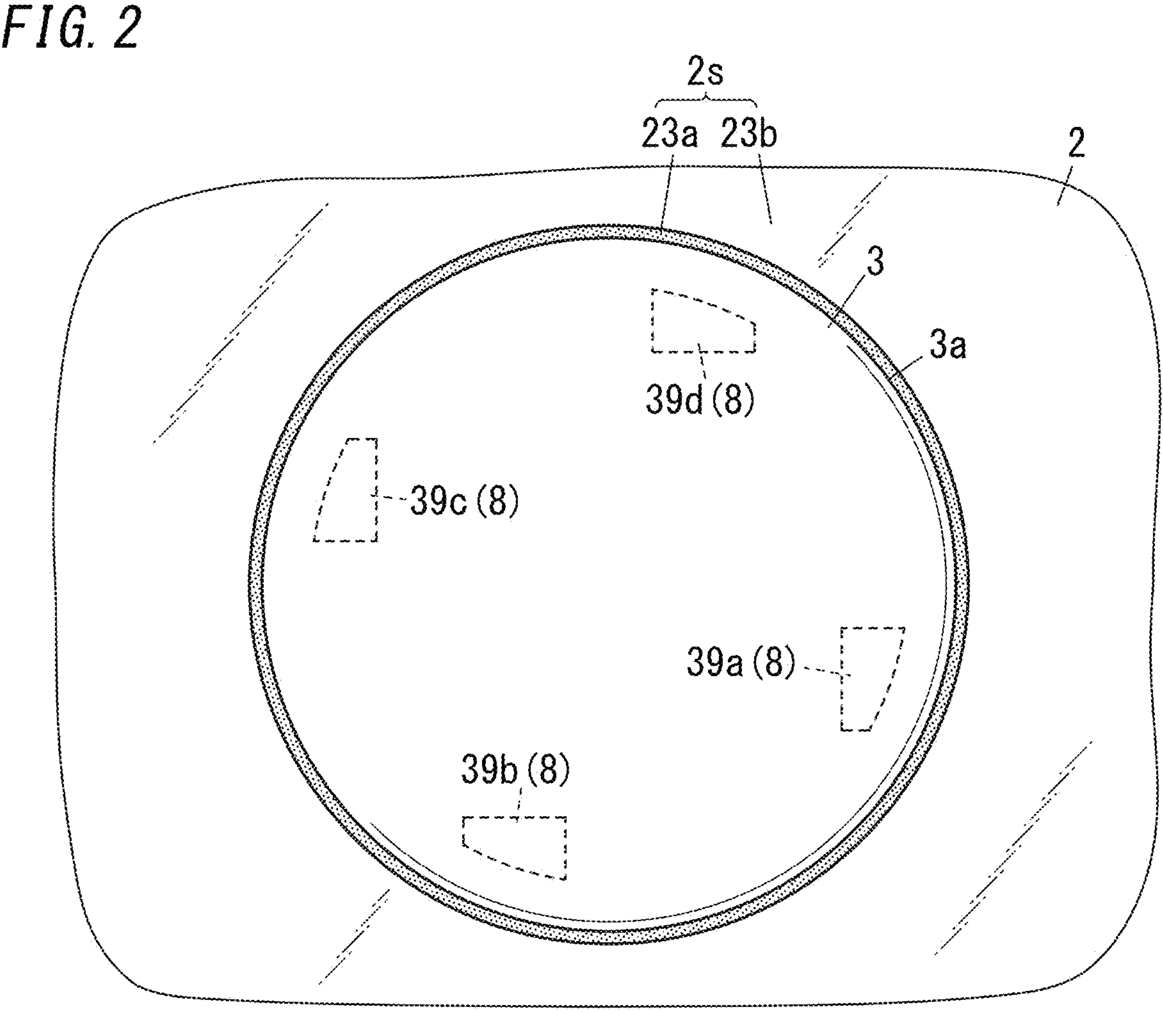
FIG. 2 is a plan view of a front face of a substrate included in the adherend-equipped substrate.
Figure 3:
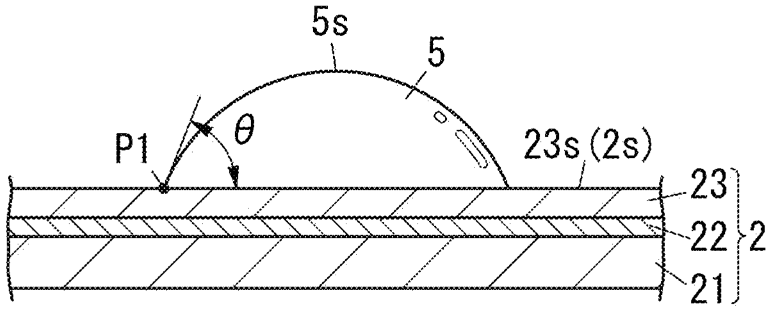
FIG. 3 is an illustrative view of a contact angle of the front face of the substrate.

As shown in FIG. 1, an adherend-equipped substrate 1 of the present embodiment includes a substrate 2 and an adherend 3. The adherend 3 is bonded to a front face 2*s* of the substrate 2. The substrate 2 includes a substrate body 21 and a protective layer 23. The protective layer 23 having a front face 23*s* is disposed at a side of a front face 21*s* of the substrate body 21. The front face 23*s* of the protective layer 23 includes a first region 23*a* and a second region 23*b*. The first region 23*a* is a region to which the adherend 3 is bonded with an adhesive 4. The first region 23*a* has a first contact angle. The second region 23*b* is a region other than the first region 23*a* and has a second contact angle. The first contact angle is smaller than the second contact angle.

With this configuration, the first contact angle of the first region 23*a* is smaller than the second contact angle of the second region 23*b* in the front face 23*s* of the protective layer 23. Thus, a large number of local air layers can be suppressed from being mixed in an adhesive layer formed from the adhesive 4 when the adhesive 4 is applied to the first region 23*a*. As a result, the adherend 3 can be firmly bonded to the front face 23*s* of the protective layer 23 with the adhesive 4.

(2) Details (2-1) Configuration

With reference to FIGS. 1 to 6, the adherend-equipped substrate 1 of the present embodiment will be described in detail.

The adherend-equipped substrate 1 of the present embodiment is, in sum, an adherend-equipped substrate configured to allow the adherend 3 to be firmly bonded, with the adhesive 4, to the front face 2*s* of the substrate 2 whose outermost layer is the protective layer 23 (i.e., to the front face 23*s* of the protective layer 23). Therefore, the adherend-equipped substrate 1 is applicable to any technical field as long as the technical field includes a configuration that the adherend 3 is bonded, with the adhesive 4, to the front face 2*s* of the substrate 2 whose outermost layer is the protective layer 23.

For example, the adherend-equipped substrate 1 is applicable to the case where an input device is bonded, with an adhesion, to a front face of a cover lens disposed on a front face of a touch panel sensor. Here, the input device is a device that causes an operation given to the input device to be detect by a touch detecting function of the touch panel sensor. In this case, the cover lens corresponds to the substrate 2 included in the adherend-equipped substrate 1, and the input device corresponds to the adherend 3 included in the adherend-equipped substrate 1.

Moreover, the adherend-equipped substrate 1 is applicable to the case where a camera device or a dashboard camera is bonded to an upper portion of a windshield of a car with an adhesive. In this case, the windshield corresponds to the substrate 2 included in the adherend-equipped substrate 1, and the camera device and the dashboard camera correspond to the adherend 3 included in the adherend-equipped substrate 1.

As shown in FIG. 1, the adherend-equipped substrate 1 includes the substrate 2 and the adherend 3.

The adherend 3 is an object that is bonded to the front face 2*s* of the substrate 2 with the adhesive 4. The adherend 3 may be, for example, a device or a member.

The substrate 2 is a member to which the adherend 3 is bonded. The substrate 2 includes the substrate body 21, a glass reinforcement layer 22, and the protective layer 23.

The substrate body 21 is a portion that is a base of the substrate 2. The substrate body 21 is, for example, a glass substrate. Note that the substrate body 21 is not limited to the glass substrate but may be, for example, a resin substrate.

The glass reinforcement layer 22 is a function layer that makes the substrate body 21, which is the glass substrate, less likely to break (i.e., a reinforcement layer that reinforces the glass substrate). The glass reinforcement layer 22 is disposed on the front face 21*s* of the substrate body 21. The glass reinforcement layer 22 may be, for example, a compression stress layer or may be a reinforcement film.

The compression stress layer is formed on the front face 21*s* of the substrate body 21 by subjecting the front face 21*s* of the substrate body 21, which is the glass substrate, to heat treatment or chemical treatment. In the heat treatment, the front face 21*s* of the substrate body 21, which is the glass substrate, is heated and is then rapidly cooled, thereby forming the compression stress layer on the front face 21*s* of the substrate body 21. Moreover, in the chemical treatment, the compression stress layer is formed on the front face 21*s* of the substrate body 21 by replacing sodium ions in the front face 21*s* of the substrate body 21, which is the glass substrate, with potassium ions each having a large ion radius. The reinforcement film is a film bonded to the front face 21*s* of the substrate body 21 and can be formed from, for example, acryl, soft acryl, or polycarbonate.

Note that the glass reinforcement layer 22 is not an essential element and may thus be omitted. In this case, the protective layer 23 is disposed on the front face 21*s* of the substrate body 21. Moreover, in place of the glass reinforcement layer 22, a function layer having a function other than the glass reinforcement layer 22 may be provided between the substrate body 21 and the protective layer 23.

The protective layer 23 is a layer that protects a front face 22*s* of the glass reinforcement layer 22 (i.e., a front face of a layer underlying the protective layer 23). The protective layer 23 is disposed on the front face 22*s* of the glass reinforcement layer 22. The protective layer 23 is, for example, an anti-fingerprint layer that prevents fingerprint from being left on the front face 22*s* of the glass reinforcement layer 22.

The protective layer 23 can be formed from, for example, a fluororesin, silicone, or fluorine denatured silane. The fluororesin may specifically be a fluoroethylene vinyl ether copolymer or polytetrafluoroethylene (PTFE). The silicone may specifically be a silicone resin or silicone oligomer. The fluorine denatured silane is mainly used for touch panels.

The front face 23*s* of the protective layer 23 constitutes the front face 2*s* of the substrate 2. The front face 23*s* of the protective layer 23 includes the first region 23*a* and the second region 23*b*.

The first region 23*a* is a region to which the adherend 3 is bonded with the adhesive 4. The first region 23*a* is, for example, a region including an outer shape 3*a* of an adhesion surface of the adherend 3 to the protective layer 23 (see FIG. 2). The adhesion surface of the adherend 3 is a contact surface of the adherend 3 to the protective layer 23. In the example shown in FIG. 2, the outer shape 3*a* of the adhesion surface of the adherend 3 is a circular shape, and the first region 23*a* has a circular shape. Here, the "region including the outer shape 3*a* of the adhesion surface of the adherend 3" may be, for example, a region having the same shape and the same size as the outer shape 3*a* of the adhesion surface of the adherend 3, or may be a region slightly larger than the outer shape 3*a* of the adhesion surface of the adherend 3. In the example shown in FIG. 2, the first region 23*a* is a region slightly larger than the outer shape 3*a* of the adhesion surface of the adherend 3. The second region 23*b* is a region which is included in the front face 23*s* of the protective layer 23 and which is other than the first region 23*a*. The first region 23*a* has the first contact angle as a contact angle, the second region 23*b* has the second contact angle as a contact angle, and the first contact angle is smaller than the second contact angle. In the present embodiment, for example, the second contact angle is larger than 90 degrees, and the first contact angle is smaller than or equal to 90 degrees.

Here, the "contact angle" is an index for evaluating a property (wettability) representing the ease of adhesion of a droplet (in the present embodiment, the adhesive 4) to the front face 23*s* of the protective layer 23. The "contact angle" is an angle θ formed, in a side view of an adhesion state of, for example, water 5 (e.g., pure water), as a droplet for contact angle measurement instead of the adhesive 4, adhering to the front face 23*s* of the protective layer 23, between a droplet surface 5*s* and the front face 23*s* of the protective layer 23 at a point PI at which the droplet surface 5*s* is in contact with the front face 23*s* of the protective layer 23 (see FIG. 3). The first contact angle is an angle θ of a droplet for the contact angle measurement (e.g., water) applied to the first region 23*a*, and the second contact angle is an angle θ of a droplet for the contact angle measurement (e.g., water) applied to the second region 23*b*. As the contact angle decreases, the ease of adhesion of the droplet to the front face 23*s* of the protective layer 23 increases.

Here, an example will be described which uses pure water as the droplet for the contact angle measurement to perform a magnitude comparison of the contact angle between the two regions 23*a* and 23*b*. Note that an adhesive having a different viscosity from the pure water may be used as the droplet for the contact angle measurement to perform the magnitude comparison of the contact angle between the two regions 23*a* and 23*b*. In this case, absolute values (measured values) of adhesion angles of the two regions are different from those in the case where the pure water is used, but a magnitude relationship of the adhesion angle between the two regions is the same as that in the case where the pure water is used.

Thus, the first contact angle of the first region 23*a* to which the adherend 3 is bonded is smaller than the second contact angle of the second region 23*b*, thereby improving adhesion of the adhesive 4 to the first region 23*a*. Thus, a large number of local air layers can be suppressed from being mixed in the adhesive layer formed from the adhesive 4 when the adhesive 4 is applied to the first region 23*a*. As a result, the adherend 3 can be firmly bonded to the first region 23*a* of the protective layer 23 with the adhesive 4. More specifically, the first contact angle of the first region 23*a* is preferably smaller than or equal to 90 degrees. This can satisfactorily improve the adhesion of the adhesive 4 to the first region 23*a*.

Thus, the first contact angle of the first region 23*a* being smaller than the second contact angle of the second region 23*b*, or the first contact angle of the first region 23*a* being smaller than or equal to 90 degrees is achieved by subjecting the first region 23*a* of the protective layer 23 to surface processing by, for example, laser irradiation or sandblasting. Note that the surface processing by the laser irradiation or the sandblasting includes: removing the front face 23*s* of the protective layer 23 to a physically fixed depth; and reforming the front face 23*s* of the protective layer 23.

Figure 4:
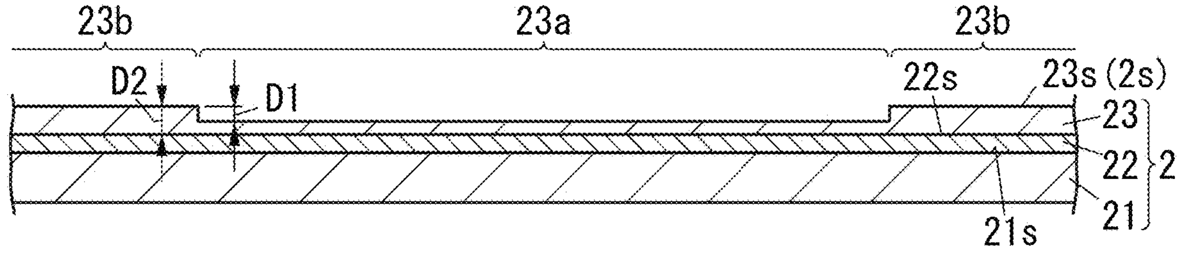
FIG. 4 is an illustrative view of a processed level difference between a first region and a second region.

At this time, removing a front face in the first region 23*a* to a physically fixed depth by the surface processing may form a processed level difference D1 such that the first region 23*a* is stepped lower than the second region 23*b* on the front face 23*s* of the protective layer 23 (see FIG. 4).

Even when the processed level difference D1 is formed as described above, the processed level difference D1 is restricted to be smaller than a thickness D2 of the protective layer 23 in the second region 23*b* in the present embodiment. This can prevent the layer underlying the protective layer 23 from being exposed or the layer underlying the protective layer 23 from being cut off due to the surface processing. The processed level difference D1 is preferably smaller than or equal to one-half (desirably smaller than or equal to one-third) the thickness D2 of the protective layer 23. This can reliably prevent the layer underlying the protective layer 23 from being exposed in the first region 23*a* of the protective layer 23 due to the processed level difference D1. As a result, the adherend 3 can be bonded to the first region 23*a* with the adhesive 4 without influencing the layer underlying the protective layer 23.

(2-2) Manufacturing Method

Figure 5A:
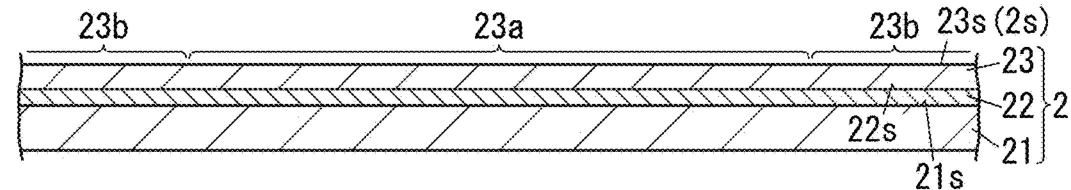
FIG. 5A is an illustrative view of a step of subjecting the front face of the substrate to surface processing.
Figure 5B:
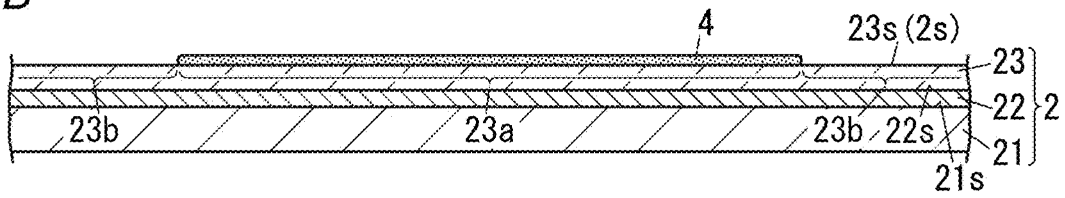
FIG. 5B is an illustrative view of a step of applying an adhesive to the front face of the substrate.
Figure 5C:
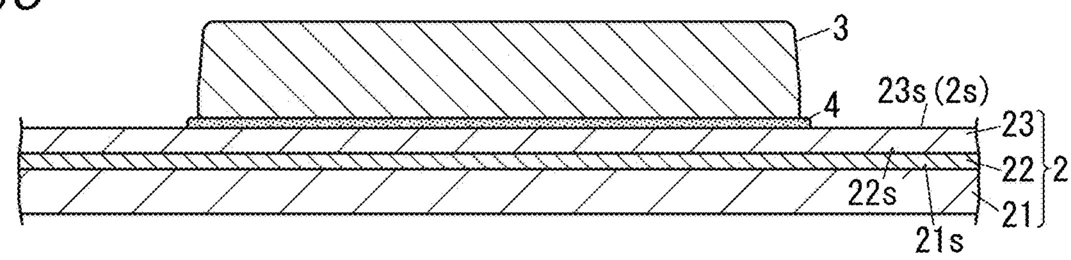
FIG. 5C is an illustrative view of a step of bonding an adherend to the front face of the substrate with the adhesive.
Figure 6A:
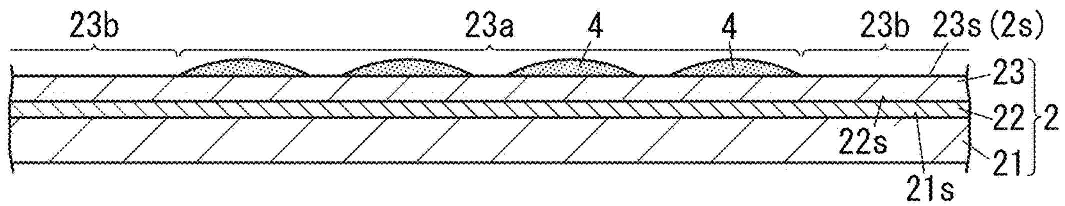
FIG. 6A is an illustrative view of a step of applying an adhesive to a front face of a substrate of Comparative Example 1.
Figure 6B:
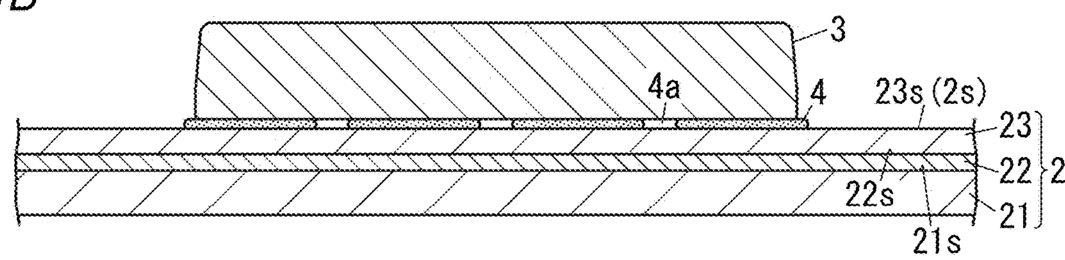
FIG. 6B is an illustrative view of a step of bonding an adherend to the front face of the substrate of Comparative Example 1 with the adhesive.

With reference to FIGS. 5A to 5C, a manufacturing method of the adherend-equipped substrate 1 will be described.

The substrate 2 is prepared (see FIG. 5A). Then, of the front face 2*s* of the substrate 2 (i.e., the front face 23*s* of the protective layer 23), the second region 23*b* is not subjected to the surface processing by the laser irradiation or the sandblasting, but only the first region 23*a* is subjected to the surface processing by the laser irradiation or the sandblasting. The surface processing on the first region 23*a* makes the first contact angle of the first region 23*a* smaller than the second contact angle of the second region 23*b*. In the present embodiment, the contact angle of the front face 23*s* of the protective layer 23 (i.e., the second contact angle of the second region 23*b*) before the surface processing on the first region 23*a* is assumed to be larger than 90 degrees. Therefore, in the present embodiment, the first contact angle is made smaller than or equal to 90 degrees by the surface processing on he first region 23*a*.

Note that the surface processing (surface reforming) may be performed on the first region 23*a* by using an excimer laser, and in this case, of the front face 2*s* of the substrate 2, the first region 23*a* is exposed, and the second region 23*b* is covered with a mask material. Then, the substrate 2 is placed in a laser chamber of an excimer laser device. Then, in the laser chamber, the surface processing is performed on only the first region 23*a* by a gas laser which uses a mixed gas of a noble gas and halogen as a catalyst and which is excited by pulse discharge. Thus, placing a plurality of substrates 2 in the laser chamber enables respective first regions 23*a* of the plurality of substrates 2 to be subjected to the surface processing simultaneously. That is, a large number of substrates 2 can be produced at one time.

Then, to the first region 23*a* after the surface processing is applied the adhesive 4 (see FIG. 5B). At this time, the first contact angle of the first region 23*a* is smaller than or equal to 90 degrees. Thus, a large number of local air layers can be suppressed from being mixed in the adhesive layer formed from the adhesive 4 when the adhesive 4 is applied to the first region 23*a*. That is, the adhesive 4 can be applied to the first region 23*a* well.

Then, the adherend 3 is bonded via the adhesive layer formed from the adhesive 4 to the first region 23*a* (see FIG. 5C). At this time, the adhesive layer formed from the adhesive 4 includes almost no local air layer, and therefore, the adherend 3 can be firmly bonded to the first region 23*a* with the adhesive 4.

(2-3) Comparison with Comparative Example 1 in which the First Contact Angle and the Second Contact Angle are the Same Comparative Example 1 has a configuration similar to that of the adherend-equipped substrate 1 in the present embodiment except that a first contact angle of a first region 23*a* is the same as a second contact angle of a second region 23*b*. That is, in Comparative Example 1, the first region 23*a* is not subjected to surface processing by the laser irradiation or the sandblasting. Therefore, the first contact angle of the Comparative Example 1 is larger than the first contact angle of the adherend-equipped substrate 1 described in the present embodiment. That is, in Comparative Example 1, adhesion of an adhesive 4 to the first region 23*a* is low as compared with the adherend-equipped substrate 1 of the present embodiment. Therefore, in Comparative Example 1, when the adhesive 4 is applied to the first region 23*a*, a distribution of the adhesive 4 in the first region 23*a* is patchy (see FIG. 6A). If an adherend 3 is bonded to the first region 23*a* with the adhesive 4 in this state, a large number of local air layers 4*a* are mixed in an adhesive layer formed from the adhesive 4 (see FIG. 6B). Therefore, in Comparative Example 1, the adherend 3 cannot be firmly bonded to the first region 23*a* as compared with the adherend-equipped substrate 1 of the present embodiment.

(2-4) Comparison Between Surface Processing Methods (2-4-1) Comparison Results

As a surface processing method when the first region 23*a* of the adherend-equipped substrate 1 of the present embodiment is subjected to the surface processing, an effective surface processing method is considered. Table 1 below shows measurement results of various types of measuring parameters (the first contact angle, surface roughness, processed level difference, and stress test) when various types of surface processing methods (Samples 1 to 11) are performed. Note that the thickness of the protective layer 23 in each of Samples 2 to 11 is, for example, 8 μm.

TABLE 1

| No. | Sample | First Contact Angle [deg] | Surface Roughness [Ra] | Processed Level Diference [μm] | Stress Test |
|---|---|---|---|---|---|
| 1 | Glass Substrate | 27.9 | — | — | OK |
| 2 | Glass Substrate with AGARAF Coating | 111.1 | — | — | NG |
| 3 | #100 Sandblast | 11.8 | 3.94 | 12 | OK |
| 4 | #120 Sandblast | 33.2 | 3.06 | 9 | OK |
| 5 | #280 Sandblast | 14.4 | 1.9 | 0.72 | OK |
| 6 | #320 Sandblast | 46.4 | 1.86 | 1.81 | OK |
| 7 | #400 Sandblast | 63.8 | 1.39 | 1.09 | OK |
| 8 | UV-YAG Laser | 10.0 | 1.4 | 0 | OK |
| 9 | CO2 Laser (500 mm/s) | — | — | 56 | — |
| 10 | CO2 Laser (2500 mm/s) | 48.8 | — | 7.23 | OK |
| 11 | Excimer Laser | 65 | — | 0 | OK |

Each of Samples 1 and 2 is an example in which the first region 23*a* is not subjected to the surface processing and which is shown as a reference example. Sample 1 is a reference example of a case where the substrate 2 includes only a glass substrate and includes no protective layer 23. Sample 2 is a reference example of a case where the substrate 2 includes a glass substrate with an AGARAF coating and includes the protective layer 23 (an AF coating of the AGARAF coating).

Note that "AG" of the AGARAF coating means an anti-glare (AG) coating and is a finish with extra fine projections and recesses formed in a surface of the substrate 2 (the glass substrate) to diffuse reflected light, thereby suppressing reflection and/or glare. Moreover, "AR" of the AGARAF coating means an anti-reflection (AR) coating and is a finish with coatings made of materials having different refractive indices on a surface of the substrate 2 (the glass substrate) to change a light transmitting property, thereby preventing reflection of light. Furthermore, "AF" of the AGARAF coating means an anti-fingerprint (AF) coating and is a water-repellent finish of a surface of the substrate 2 (the glass substrate), thereby preventing stains of fingerprints, water, and oil.

Samples 3, 4, 5, 6, and 7 correspond to surface processing methods of subjecting the first regions 23*a* to surface processing respectively by using sand blasters of #100, #120, #280, #320, and #400. The numerical digit, such as "#100", represents a grain size (size) of sand used in the sandblasting. As the numerical digit representing the grain size increases, the sand used becomes fine.

Sample 8 corresponds to a surface processing method of subjecting the first regions 23*a* to surface processing by the laser irradiation using UV-YAG laser.

Samples 9 and 10 correspond to surface processing methods of subjecting the first regions 23*a* to surface processing by the laser irradiation using CO2 laser. Samples 9 and 10 respectively correspond to processing speeds of 500 mm/s and 2000 mm/s.

Sample 11 corresponds to a surface processing method of subjecting the first regions 23*a* to surface processing by the laser irradiation using excimer laser.

The first contact angle of the measuring parameters is a contact angle measured 5 seconds after water (pure water) as a droplet for the contact angle measurement is dropped onto the first region 23*a*. The unit of the first contact angle is [deg (degrees)].

The surface roughness of the measuring parameters is surface roughness in the first region 23*a* after the surface processing. The unit of the surface roughness is [Ra].

The processed level difference of the measuring parameters is the processed level difference D1 caused by subjecting the first regions 23*a* to the surface processing. The unit of the processed level difference is [μm].

The stress test of the measuring parameters is a test in which the adherend 3 is bonded to the first region 23*a* with the adhesive 4 and the adhesive 4 is cured, and then, the adherend 3 is pushed with a force of 300 N in a direction parallel to the first region 23*a*, thereby determining whether or not the adherend 3 is displaced out of the first region 23*a*. In Table 1, OK represents a result that the adherend 3 is not displaced out of the first region 23*a*, whereas NG in Table 1 represents a result that the adherend 3 is displaced out of the first region 23*a*.

(2-4-2) Evaluation Results

The measurement result of the stress test of Sample 2 is NG, and therefore, it can be seen that when the adherend-equipped substrate 1 includes the protective layer 23, the first region 23*a* should be subjected to the surface processing to make the first contact angle smaller than or equal to 90 degrees, and then, the adherend 3 should be bonded to the first region 23*a* with the adhesive 4.

In the case of Sample 9, the measurement result (56 μm) of the processed level difference is greater the thickness (8 μm) of the protective layer 23, and therefore, it can be seen that Sample 9 is not an effective surface processing method.

The measurement results of the stress test of Samples 3 to 8 and Samples 10 and 11 are OK, and therefore, it can be seen that Samples 3 to 8 and Sample 10 and 11 are effective surface processing methods. In particular, in Samples 5 to 8, and 10 and 11, respective measurement results (0.72 μm, 1.81 μm, 1.09 μm, 0 μm, 7.23 μm, and 0 μm) of the processed level difference are each smaller than the thickness (8 μm) of the protective layer 23. Therefore, the layer (the glass reinforcement layer 22) underlying the protective layer 23 can be prevented from being cut due to the surface processing performed on the first region 23*a*, and the function of the layer underlying the protective layer 23 can thus be prevented from being impaired due to the surface processing performed on the first region 23*a*. Moreover, in the case of Samples 8 and 11, a surface level difference is zero, and therefore, the function of the protective layer 23 is suppressed from being degraded due to the surface processing performed on the first region 23*a*.

Moreover, from a comparison of the measurement result (111.1 degrees) of the first contact angle of Sample 2 for which the result of the stress test is NG with the measurement results (11.8 degrees, 33.2 degrees, 14.4 degrees, 46.4 degrees, 63.8 degrees, 10.0 degrees, 48.8 degrees, 65 degrees) of the first contact angles of Samples 1, 3 to 8, and 10 and 11 for each of which the result of the stress test is OK, it can be estimated that the first contact angle of, for example, 90 degrees or smaller is effective to achieve the result of the stress test being OK.

(3) Application Examples

An example of applying the adherend-equipped substrate 1 of the present embodiment to an input system obtained by combining an input device and a touch panel sensor will be described.

(3-1) Overview

Figure 7:
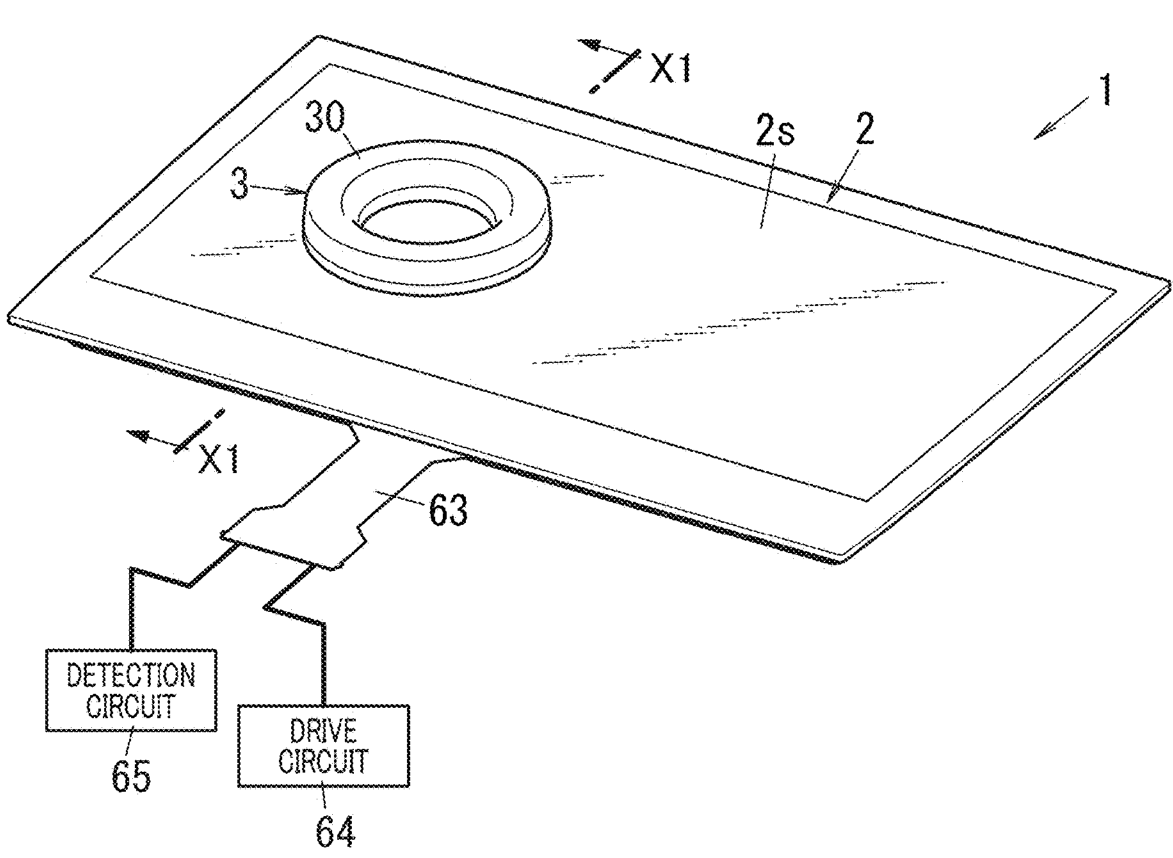
FIG. 7 is a perspective view of an input system which is an application example of the adherend-equipped substrate.
Figure 8:
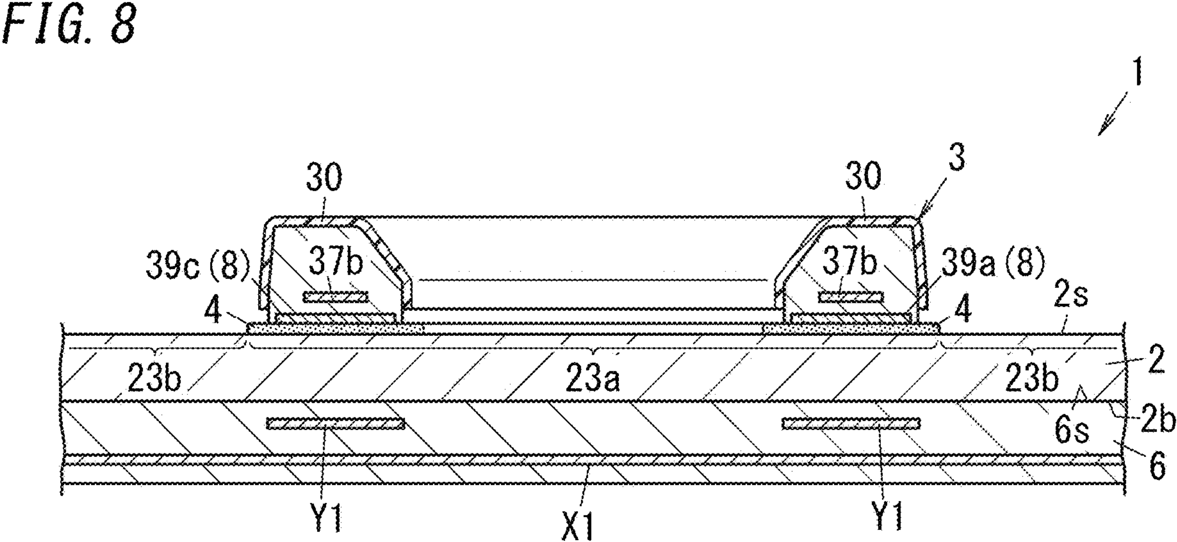
FIG. 8 is a schematic diagram of a cross section along line X1-X1 of FIG. 7.
Figure 9:
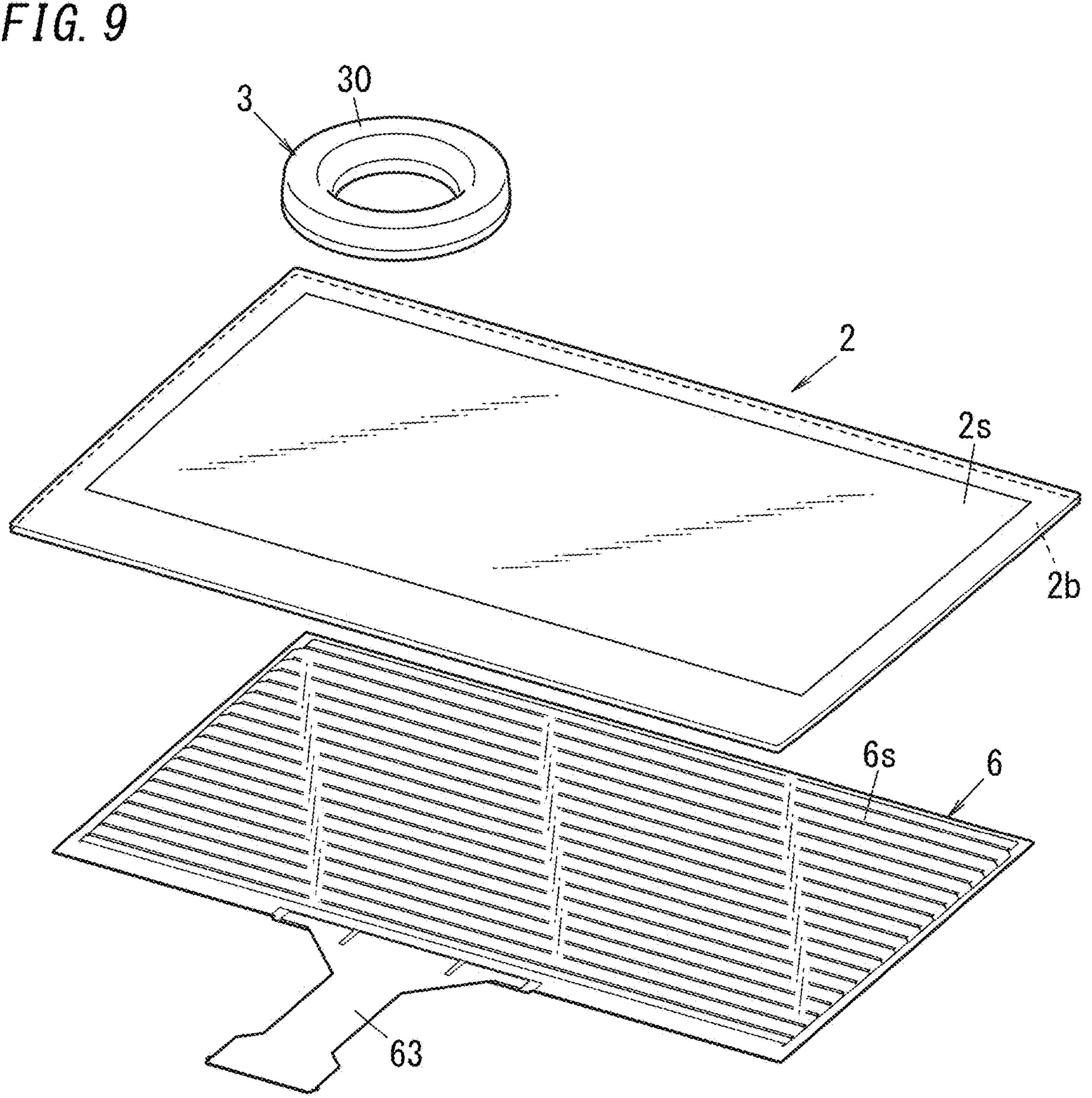
FIG. 9 is an exploded perspective view of the input system.

As shown in FIGS. 7, 8, and 9, the adherend-equipped substrate 1 as the input system further includes a touch panel sensor 6 disposed on a rear face 2*b* of the substrate 2 in addition to the components in "(1) Overview". The touch panel sensor 6 includes a plurality of sensor electrodes (a plurality of first wiring electrodes X1 and a plurality of second wiring electrodes Y1) for detecting a touch position on the front face 2*s* of the substrate 2 by an operator. The adherend 3 is an input device that receives operations (e.g., a rotation operation and a push operation) given by the operator. The input device is hereinafter referred to as the input device 3. The input device 3 includes an operation unit 30 and a counter electrode 8. The operation unit 30 is displaced in accordance with the operation given by the operator. The counter electrode 8 faces at least one of the plurality of sensor electrodes (the plurality of first wiring electrodes X1 and the plurality of second wiring electrodes Y1). An electrical state (e.g., an electrostatic capacitance value) of the counter electrode 8 changes in accordance with the displacement of the operation unit 30.

This configuration enables the input device 3 to be firmly bonded, with the adhesive 4, to the front face 2*s* of the substrate 2 disposed on a front face 6*s* of the touch panel sensor 6.

Moreover, in the adherend-equipped substrate 1 as the input system, the counter electrode 8 of the input device 3 includes first fixed electrodes (fixed electrodes 39*a*, 39*b*, and 39*d*) and a second fixed electrode (a common electrode 39*c*) which are bonded to the first region 23*a* of the front face 2*s* of the substrate 2 with the adhesive 4. The input device 3 further includes a movable electrode 37*b*. The movable electrode 37*b* is displaced together with the operation unit 30, thereby electrically connecting and disconnecting the first fixed electrodes (the fixed electrodes 39*a*, 39*b*, and 39*d*) to the second fixed electrode (the fixed electrode 39*c*). The electrical connection and disconnection change the electrical state (e.g., the electrostatic capacitance value) of each of the first fixed electrodes and the second fixed electrode.

With this configuration, the configuration that the input device 3 includes the fixed electrodes 39*a* to 39*d* (the first fixed electrodes and the second fixed electrode) and the movable electrode 37*b* enables the input device 3 to be firmly bonded with, the adhesive 4, to the front face 2*s* of the substrate 2 disposed on a front face 6*s* of the touch panel sensor 6.

(3-2) Details (3-2-1) Overall Configuration

As shown in FIGS. 7 and 9, the adherend-equipped substrate 1, which is the input system, includes the substrate 2 which is a cover lens, the adherend 3, which is the input device, and the touch panel sensor 6. in the following description, the substrate 2 is referred to as a cover lens 2, and the adherend 3 is referred to as the input device 3.

The cover lens 2 is a member that protects the front face 6*s* of the touch panel sensor 6. The cover lens 2 is formed from a transparent member to have a sheet shape and is disposed on the front face 6*s* of the touch panel sensor 6.

The touch panel sensor 6 is a device disposed on a display screen of a predetermined display device and configured to detect a touch position on the display screen (i.e., a touch position on the front face 2*s* of the cover lens 2) by the operator.

The input device 3 is a device that receives the operations (e.g., the rotation operation and the push operation) given by the operator. The input device 3 has, for example, a circularly annular shape. In front of the input device 3 is provided the operation unit 30 to which the operator gives the operations. The input device 3 has a rear face (i.e., a rear face 38*b* of a case 38 described later) on which the fixed electrodes 39*a* to 39*d* are provided (see FIG. 10). The rear face 38*b* of the input device 3 is an adhesion surface to the front face 2*s* of the cover lens 2. The input device 3 is bonded to an arbitrary position on the front face 2*s* of the cover lens 2 with an adhesive (see FIG. 7). In this bonded state, if an operation is given to the operation unit 30, then the electrical state (e.g., the electrostatic capacitance value) of each of the fixed electrodes 39*a* to 39*d* changes in accordance with the operation. The electrical state is detected by a touch position detecting function of the touch panel sensor 6, and thereby, the operation given to the operation unit 30 is detected.

(3-2-2) Details of Input Device

Figure 10:
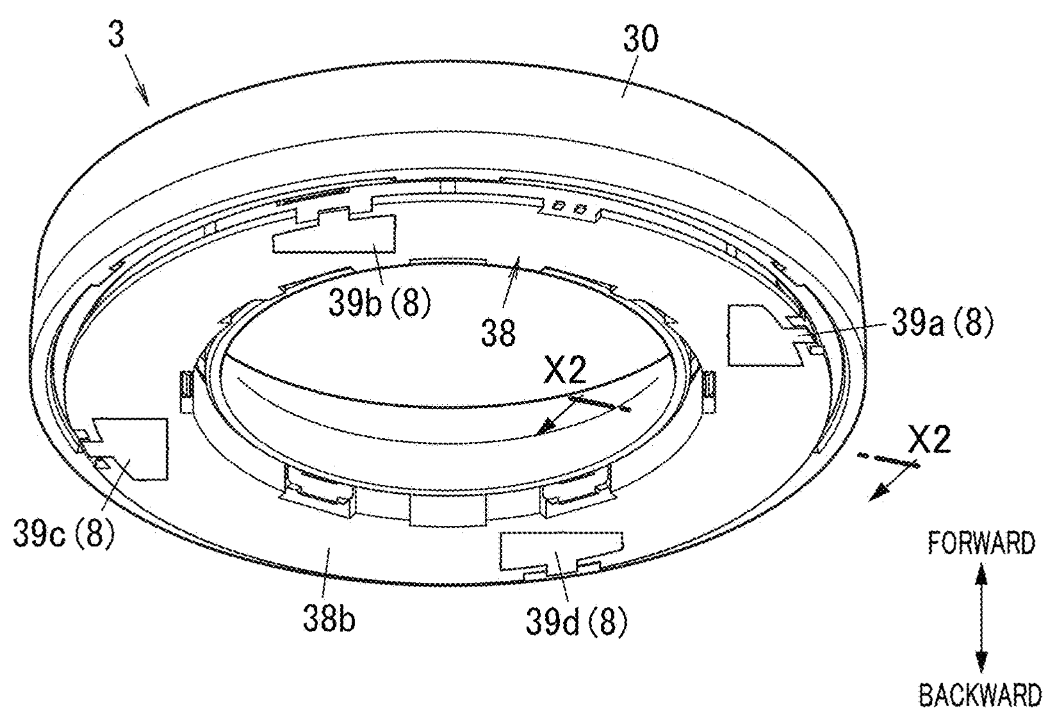
FIG. 10 is a perspective back view of an input device included in the input system.
Figure 11:
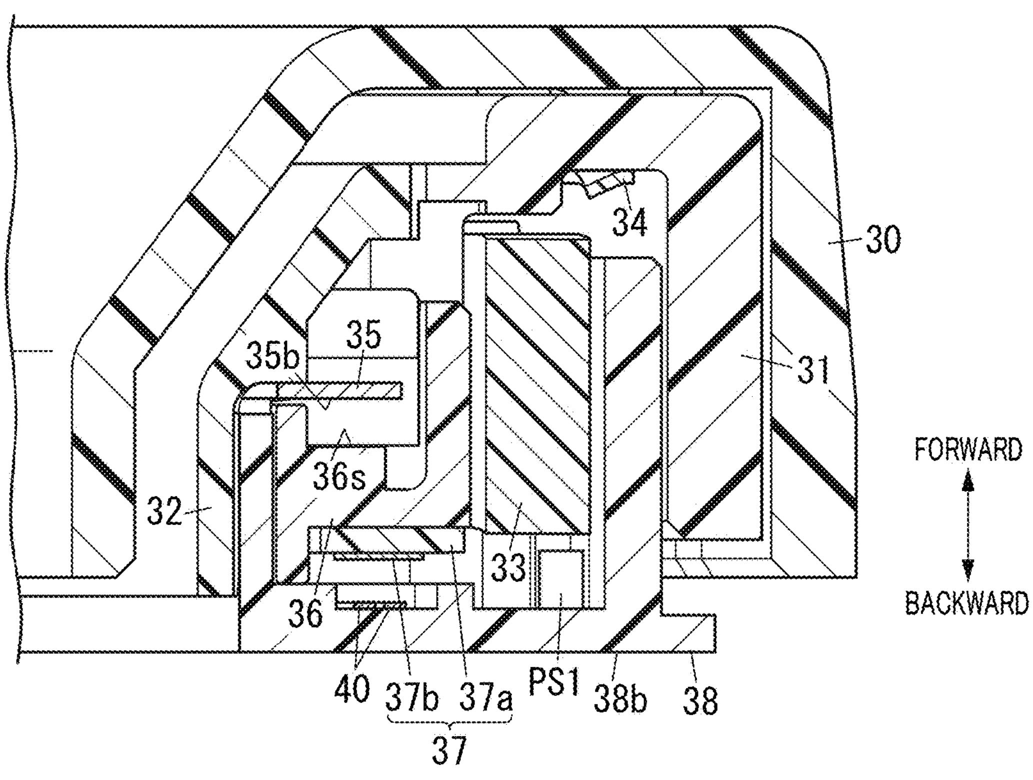
FIG. 11 is a sectional view along line X2-X2 of FIG. 10.

With reference to FIGS. 7, 10, and 11, details of an example of the input device 3 will be described.

As shown in FIG. 11, the input device 3 includes the operation unit 30, a rotor 31, a fixing member 32, a pushing member 33, a return spring 34, a click spring 35, a rotary click cam 36, and a rotary contact plate 37. Moreover, the input device 3 includes the case 38, the plurality of (e.g., four) fixed electrodes 39*a* to 39*d* (see FIG. 10), a plurality of (e.g., four) contacts 40, and a push switch. Note that the four contacts 40 are distinguished from one another as the first to fourth contacts 40 as necessary.

The operation unit 30 is a component that receives the operations (the rotation operation and the push operation) given by the operator and is displaced (rotated and moved forward and backward) in accordance with the operations thus received. The operation unit 30 is displaceable with respect to the case 38 (and thus, with respect to the fixed electrodes 39*a* to 39*d*) in accordance with the operations given by the operator. The operation unit 30 has a box shape having a center opening and a circularly annular shape in plan view. The operation unit 30 has a rear face having an opening. In the operation unit 30 are housed the components (the rotor 31, the fixing member 32, the pushing member 33, the return spring 34, the click spring 35, the rotary click cam 36, the rotary contact plate 37, and the case 38).

The rotor 31 is disposed to be displaceable (rotatable and movable forward and backward) with respect to the case 38. The rotor 31 is rotatable and movable forward and backward together with the operation unit 30 in accordance with the rotation and the forward and backward movement of the operation unit 30. The rotor 31 is formed from a resin. The rotor 31 has a frame shape having a center opening and having a circularly annular shape in plan view, and the rotor 31 has a front part protruding on an inner circumference side. The rotor 31 is disposed on an outer circumferential side in the operation unit 30 and is fixed to the operation unit 30.

The fixing member 32 is a member that fixes the rotor 31 to the case 38 such that the rotor 31 is rotatable and movable forward and backward. The fixing member 32 is formed from a resin. The fixing member 32 has, for example, a cylindrical shape having an opening and having an annular shape in plan view, and the fixing member 32 has a front part tilted toward the outer circumferential side. The fixing member 32 is fixed to the case 38 such that the fixing member 32 is disposed inside the rotor 31. The front part of the fixing member 32 has an outer circumferential edge disposed on a front face of an inner circumferential edge of the rotor 31. Thus, the fixing member 32 fixes the rotor 31 to the case 38 such that the rotor 31 is rotatable and movable forward and backward.

The pushing member 33 is a member that moves forward and backward in accordance with the forward and backward movement of the operation unit 30 to push a push switch PS1 in the case 38. The pushing member 33 has a shortened cylindrical shape. In the case 38, the pushing member 33 is disposed behind the inner circumferential edge of the rotor 31 (a portion, protruding on the inner circumference side, of the front part of the rotor 31).

The return spring 34 is a spring member that urges the operation unit 30 forward. The return spring 34 has a circularly annular plate shape and is curved forward and backward along a circumferential direction. The return spring 34 is disposed between the rotor 31 and a front end of an outer circumferential wall of the case 38. The return spring 34 urges the rotor 31 forward, thereby urging the operation unit 30 forward.

The click spring 35 is a component that provides, together with the rotary click cam 36, a click feeling in response to the rotation operation given by the operator. The click spring 35 has a circularly annular thin plate shape. The click spring 35 has two projections on a rear face 35*b* of the click spring 35. The two projections are disposed in the circumferential direction at equal intervals and protrude backward. The click spring 35 is fixed to the case 38 such that the two projections are in contact with recesses and projections (described later) in a front face 36*s* of the rotary click cam 36. The click spring 35 is fixed by being sandwiched between the fixing member 32 and a front end of an inner circumferential wall part of the case 38.

The rotary click cam 36 is a component that provides, together with the click spring 35, a click feeling in response to the rotation operation given by the operator. The rotary click cam 36 is formed from a resin and has a circularly annular plate shape. The rotary click cam 36 has the recesses and projections. The recesses and projections are formed such that the projection and the recess are alternately repeated in the entire circumferential direction in the front face 36*s* of the rotary click cam 36. The rotary click cam 36 is disposed behind the click spring 35 such that the two projections of the click spring 35 are in contact with the recesses and projections. The rotary click cam 36 is coupled to the rotor 31 and rotates together with the rotor 31. When the rotary click cam 36 rotates, the two projections of the click spring 35 climb over each projection of the recesses and projections, thereby providing the click feeling.

The rotary contact plate 37 has a circularly annular plate shape. The rotary contact plate 37 includes: an insulating substrate 37*a* having a circularly annular plate shape; and the movable electrode 37*b*. The movable electrode 37*b* moves together with the operation unit 30 and is displaced relative to the fixed electrodes 39*a* to 39*d* described later, thereby electrically connecting and disconnecting the fixed electrodes 39*a*, 39*b*, and 39*d* to the fixed electrode 39*c*, and the electrical connection and disconnection changes the electrical state (e.g., the electrostatic capacitance value) of each of the fixed electrodes 39*a* to 39*d*. The movable electrode 37*b* is provided on a rear face of the insulating substrate 37*a*. The movable electrode 37*b* includes a plurality of electrode units electrically connected to each other. The plurality of electrode units are aligned on the rear face of the insulating substrate 37*a* at equal intervals in the circumferential direction. The rotary contact plate 37 has a front face fixed to a rear face of the rotary click cam 36. Thus, the rotary contact plate 37 rotates together with the rotary click cam 36.

To the case 38 are attached the components (the operation unit 30, the rotor 31, the fixing member 32, the pushing member 33, the return spring 34, the click spring 35, the rotary click cam 36, the rotary contact plate 37, the four fixed electrodes 39*a* to 39*d*, the four contacts 40, and the push switch) (see FIGS. 10 and 11).

The case 38 is formed from a resin. The case 38 has a box shape having a center opening and having a circularly annular shape in plan view and has a front face having an opening. The rear face 38*b* of the case 38 is provided with the four fixed electrodes 39*a* to 39*d* (see FIG. 10). Each of the fixed electrodes 39*a* to 39*d* has, for example, a substantially rectangular shape. The fixed electrodes 39*a* to 39*d* are disposed on the rear face 38*b* of the case 38 at intervals (e.g., equal intervals) in the circumferential direction.

The rear face 38*b* of the case 38 is an adhesion surface to the front face 2*s* of the cover lens 2. That is, the rear face 38*b* of the case 38 is bonded to the first region 23*a* of the front face 2*s* of the cover lens 2 with the adhesive 4, and thereby, the input device 3 is bonded to the front face 2*s* of the cover lens 2 with the adhesive 4.

In this bonded state, the four fixed electrodes 39*a* to 39*d* are bonded to the first region 23*a* of the front face 2*s* of the cover lens 2 with the adhesive 4. Then, in plan view in a direction orthogonal to the front face 2*s* of the cover lens 2, the first region 23*a* includes the fixed electrodes 39*a* to 39*d* (see FIG. 2). Moreover, in the bonded state, each of the four fixed electrodes 39*a* to 39*d* faces at least one of the plurality of sensor electrodes (the plurality of first wiring electrodes X1 and the plurality of second wiring electrodes Y1) of the touch panel sensor 6. The electrical state (e.g., the electrostatic capacitance value) of each of the four fixed electrodes 39*a* to 39*d* changes in accordance with the displacement of the operation unit 30 as described later.

On a bottom surface in the case 38 are disposed the four contacts 40 and the push switch PS1. Each contact 40 elastically comes into contact with a rear face of the rotary contact plate 37 and is thereby electrically connectable to the movable electrode 37*b* of the rotary contact plate 37. The four contacts 40 correspond to the four fixed electrodes 39*a* to 39*d* on a one-to-one basis and are electrically connected to the respective fixed electrodes 39*a* to 39*c*. In the present embodiment, the first contact 40 is connected to the fixed electrode 39*a*, the second contact 40 is connected to the fixed electrode 39*b*, and the third and fourth contacts 40 are connected to the fixed electrode 39*c*. The push switch PS1 is a push button switch which is switched ON and OFF by the push operation given to the operation unit 30. The push switch PS1 electrically connects and disconnects the fixed electrode 39*d* and the fixed electrode 39*c* to each other in response to being switched ON and OFF, respectively. The fixed electrode 39*c* may hereinafter be referred to as a common electrode 39*c*.

In the input device 3, the fixing member 32 and the click spring 35 are fixed to the case 38, and the rotor 31 and the rotary click cam 36 are coupled to, and rotatable together with, the operation unit 30. The operation unit 30 and the rotor 31 are further coupled together to be movable forward and backward.

Thus, when the rotation operation is given to the operation unit 30, the rotary click cam 36 rotates together with the operation unit 30. Thus, contact points of the four contacts 40 provided for the case 38 relatively move on the rear face of the rotary contact plate 37 fixed to the rotary click cam 36. This movement repeatedly brings the four contacts 40 into, and out of, contact with each of the plurality of electrode units of the movable electrode 37*b* of the rotary contact plate 37. At this time, when at least one of the third or fourth contact 40 and the first contact 40 are both brought into contact with the movable electrode 37*b*, the fixed electrode 39*a* and the common electrode 39*c* are electrically connected to each other via the movable electrode 37*b*. Moreover, when the first contact 40 and one of the third or fourth contact 40 are brought out of contact with the movable electrode 37*b*, the fixed electrode 39*a* and the common electrode 39*c* are electrically disconnected from each other. When at least one of the third or fourth contact 40 and the second contact 40 are both brought into contact with the movable electrode 37*b*, the fixed electrode 39*b* and the common electrode 39*c* are electrically connected to each other via the movable electrode 37*b*. Moreover, when the second contact 40 and any one of the third and fourth contacts 40 are brough out of contact with the movable electrode 37*b*, the fixed electrode 39*b* and the common electrode 39*c* are electrically disconnected from each other. When each of the fixed electrodes 39*a*, 39*b*, and 39*d* is electrically connected to the common electrode 39*c*, the electrostatic capacitance value of each of the fixed electrodes 39*a*, 39*b*, and 39*d* changes (increases) by the electrostatic capacitance value of the common electrode 39*c*. Thus, the movable electrode 37*b* is, together with the operation unit 30, displaced relative to the fixed electrodes 39*a* to 39*d*, thereby changing the electrical state (e.g., the electrostatic capacitance value) of each of the fixed electrodes 39*a* to 39*d*.

Moreover, when the push operation is given to the operation unit 30, the rotor 31 and the pushing member 33 move backward together with the operation unit 30, and thereby, a pushing force of the pushing member 33 switches ON the push switch. Moreover, when the push operation is no longer given to the operation unit 30, the return spring 34 returns the operation unit 30, the rotor 31, and the pushing member 33 to their initial positions. Thus, the push switch is switched OFF. When the push switch is switched ON, the fixed electrode 39*d* and the common electrode 39*c* are electrically connected to each other, and when the push switch is switched OFF, the fixed electrode 39*d* and the common electrode 39*c* are electrically disconnected from each other.

As described above, each of the fixed electrodes 39*a* and 39*b* is electrically connected and disconnected to the common electrode 39*c* in accordance with the rotation operation given to the operation unit 30. The electrical state (the electrostatic capacitance value) of each of the fixed electrodes 39*a* and 39*b* changes in accordance with the electrical connection and disconnection to the common electrode 39*c*. Moreover, the fixed electrode 39*d* is also electrically connected and disconnected to the common electrode 39*c* in accordance with the push operation given to the operation unit 30. The electrical state (the electrostatic capacitance value) of the fixed electrode 39*d* changes in accordance with the electrical connection and disconnection to the common electrode 39*c*. When each of the fixed electrodes 39*a*, 39*b*, and 39*d* is electrically connected to the common electrode 39*c*, the electrostatic capacitance value of each of the fixed electrode 39*a*, 39*b*, and 39*d* increases (changes) by the electrostatic capacitance value of the common electrode. Thus, the electrical state (e.g., electrostatic capacitance value) of each of the fixed electrodes 39*a*, 39*b*, and 39*d* changes in accordance with the operation given to the operation unit 30.

(3-2-3) Details of Touch Panel Sensor

Figure 12:
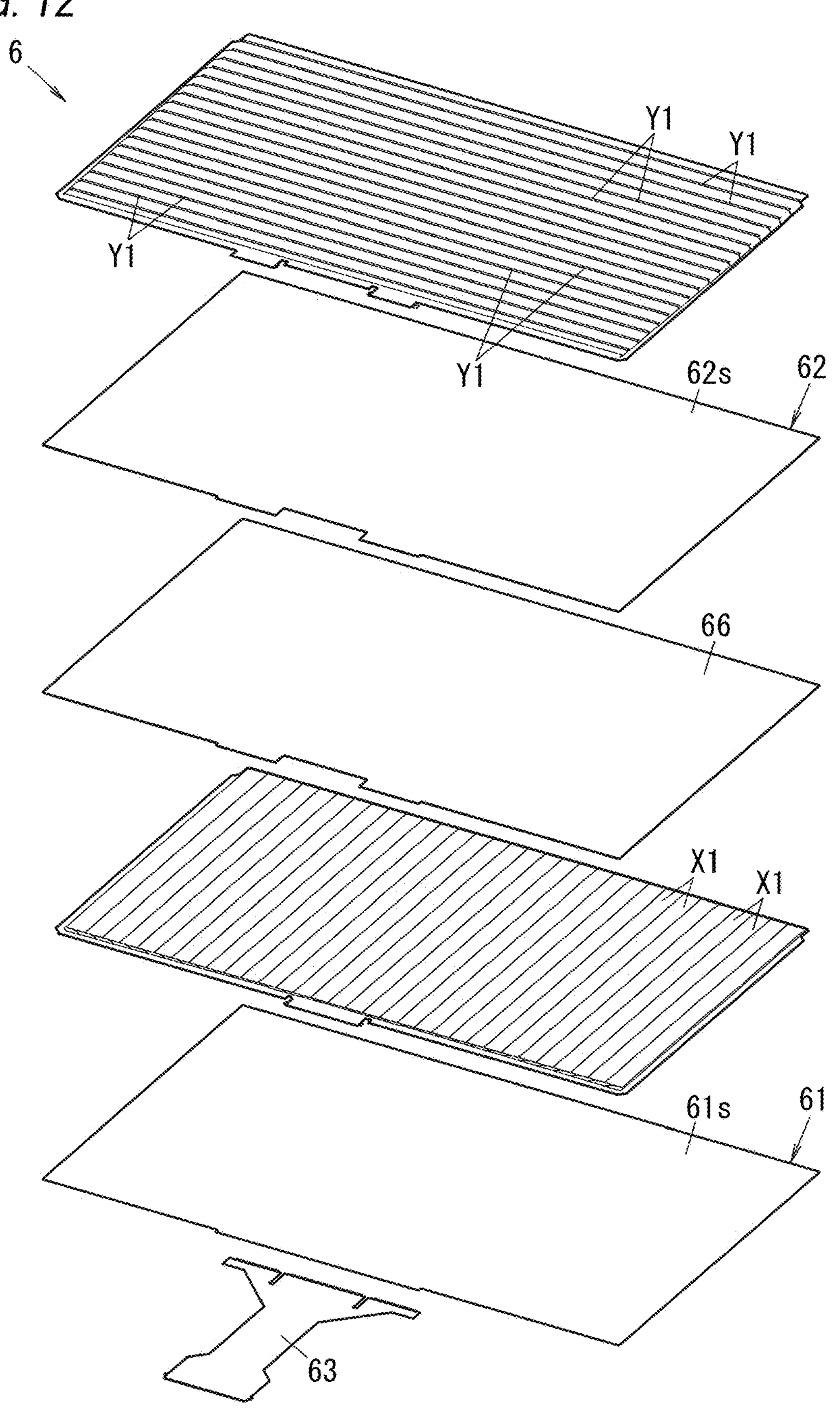
FIG. 12 is an exploded perspective view of a touch panel sensor included in the input system.

As shown in FIG. 12, the touch panel sensor 6 includes a plurality of first wiring electrodes X1, a plurality of second wiring electrodes Y1, film bases 61 and 62, a drive circuit 64 (see FIG. 7), and a detection circuit 65 (see FIG. 7).

The film bases 61 and 62 are formed from a transparent member (a resin or glass) to have a rectangular sheet shape.

The plurality of first wiring electrodes X1 and the plurality of second wiring electrodes Y1 are a plurality of sensor electrodes for detecting a touch position on the front face 6*s* of the touch panel sensor 6 (to be more precise, the front face 2*s* of the cover lens 2) by the operator. The plurality of first wiring electrodes X1 and the plurality of second wiring electrodes Y1 are formed from a transparent conductive member (e.g., indium tin oxide (ITO)) to have a belt shape. On a front face 61*s* of the film base 61, the plurality of first wiring electrodes X1 extend parallel to each other along a short side of the front face 61*s* and are aligned spaced apart from each other along a long side of the front face 61*s*. The plurality of first wiring electrodes X1 are connected to the drive circuit 64 via a flexible printed wiring board 63. On a front face 62*s* of the film base 62, the plurality of second wiring electrodes Y1 extend parallel to each other aligned with a long side of the front face 62*s* and are aligned with a short side of the front face 62*s*. The plurality of second wiring electrodes Y1 are connected to the detection circuit 65 via the flexible printed wiring board 63.

The film base 61 and the film base 62 are stacked one on top of another via an optical transparent viscosity sheet 66, and thereby, the film base 61 and the film base 62 are bonded to each other. In this bonded state, the plurality of second wiring electrodes Y1 intersect (orthogonal to) the plurality of first wiring electrodes X1 when viewed in a direction orthogonal to the film bases 61 and 62. The cover lens 2 is bonded, with an optical transparent viscosity sheet, to the plurality of second wiring electrodes Y1 on the front face 62*s* of the film base 62.

The drive circuit 64 (see FIG. 7) selectively applies a scan voltage to the plurality of first wiring electrodes X1 one by one from the first wiring electrode X1 at one end to the first wiring electrode X1 at the other end. The drive circuit 64 connects the remaining first wiring electrode(s) X1, to which no scan voltage is applied, of the plurality of first wiring electrodes X1 to a reference potential (i.e., ground potential).

The detection circuit 65 (see FIG. 7) selectively detects, for each first wiring electrode X1, respective output voltages of the plurality of second wiring electrodes Y1 one by one from the second wiring electrode Y1 at one end to the second wiring electrode Y1 at the other end while the scan voltage is applied to one first wiring electrode X1. Thus, the detection circuit 65 detects the second wiring electrode Y1 whose electrostatic capacitance value has changed. That is, when the operator touches an arbitrary position on the front face 6*s* of the touch panel sensor 6, the output voltage (the electrostatic capacitance value) of the second wiring electrode Y1 corresponding to the touch position changes. The detection circuit 65 detects the change in the output voltage (the electrostatic capacitance value) of the second wiring electrode Y1 as described above, thereby detecting the touch position on the front face 6*s* of the touch panel sensor 6 from an alignment position of the first wiring electrode X1 and an alignment position of the second wiring electrode Y1 selected at the time of the detection. A function of detecting the touch position in such a manner is hereinafter referred to as a touch position detecting function.

When an operation (a rotation operation or a push operation) is given to the operation unit 30 of the input device 3 in a state where the input device 3 is bonded to the front face 6*s* of the touch panel sensor 6, the detection circuit 65 detects the operation given to the operation unit 30 by using the touch position detecting function.

More specifically, in the state where the input device 3 is bonded to the front face 6*s* of the touch panel sensor 6, each of the fixed electrodes 39*a* to 39*d* faces at least one of the plurality of sensor electrodes (the plurality of first wiring electrodes X1 and the plurality of second wiring electrodes Y1). Much more specifically, each of the fixed electrodes 39*a* to 39*d* faces at least one of the plurality of first wiring electrodes X1 and faces at least one of the plurality of second wiring electrodes Y1. Each of the fixed electrodes 39*a* to 39*d* is capacitively coupled to the sensor electrodes which the each of the fixed electrodes 39*a* to 39*d* faces. Note that the fixed electrodes 39*a* to 39*d* are assumed not to face the same first wiring electrode X1 as each other.

Then, when the operation unit 30 of the input device 3 is operated to rotate, the fixed electrodes 39*a* and 39*b* alternately repeat electrical connection and disconnection to the common electrode 39*c*. Thus, the electrostatic capacitance values of the fixed electrodes 39*a* and 39*b* alternately increase by the electrostatic capacitance value of the common electrode 39*c*. As a result, the output voltages of the second wiring electrodes Y1 capacitively coupled to the fixed electrodes 39*a* and 39*b* alternately increase (change) by the electrostatic capacitance of the common electrode 39*c*. The changes in the output voltages of the second wiring electrodes Y1 are detected by the touch position detecting function of the touch panel sensor 6, thereby detecting whether or not the fixed electrodes 39*a* and 39*b* are electrically connected to the common electrode 39*c* (i.e., a relative relationship (e.g., a magnitude relationship) of the electrical states (the electrostatic capacitance values) of the fixed electrodes 39*a* and 39*b*). Then, the detection circuit 65 detects, based on the detected relative relationship of the electrical states of the fixed electrodes 39*a* and 39*b*, a rotational position of the operation unit 30 in time series, and from a result of the detection, the detection circuit 65 detects a rotation amount and a rotational direction of the operation unit 30.

Moreover, when the push operation is given to the operation unit 30 of the input device 3, the fixed electrode 39*d* is electrically connected to the common electrode 39*c*. Thus, the electrostatic capacitance value of the fixed electrode 39*d* increases by the electrostatic capacitance value of the common electrode 39*c*. As a result, the output voltage of the second wiring electrode Y1 capacitively coupled to the fixed electrode 39*d* increases (changes) by the electrostatic capacitance of the common electrode 39*c*. The change in the output voltage of the second wiring electrode Y1 is detected by the touch position detecting function of the touch panel sensor 6, thereby detecting whether or not the fixed electrode 39*d* is electrically connected to the common electrode 39*c*. Then, the detection circuit 65 detects, based on the output voltage of the second wiring electrode Y1 capacitively coupled to the fixed electrode 39*d*, the push operation given to the operation unit 30.

(4) Variations

Variations of the embodiment will be described. The embodiment described above and any of the variations to be described below may be combined as appropriate.

(4-1) First Variation

In the embodiment, the protective layer 23 is the anti-fingerprint layer. However, the type of the protective layer 23 is not limited to a particular type as long as the protective layer 23 is a layer protecting a layer (e.g., the glass reinforcement layer 22) underlying the protective layer 23.

Moreover, in the embodiment, the glass reinforcement layer 22 is disposed between the substrate body 21 (the glass substrate) and the protective layer 23. However, the glass reinforcement layer 22 does not have to be disposed. In this case, the protective layer 23 is disposed on the front face 21*s* of the substrate body 21. Moreover, one or more function layers having various functions different from the glass reinforcement layer 22 may be disposed between the substrate body 21 and the protective layer 23.

(4-2) Second Variation

In the application example described above, the input device 3 is configured to perform both the rotation operation and the push operation. However, the input device 3 may be configured to perform at least one of the rotation operation or the push operation.

Moreover, in the application example described above, the input device 3 includes the fixed electrodes 39*a* to 39*d*, but the input device 3 does not have to include the fixed electrodes 39*a* to 39*d*. In this case, the movable electrode 37*b* functions as the counter electrode 8. In this case, the operation given to the operation unit 30 of the input device 3 can be detected based on a distribution of electrical states of the plurality of sensor electrodes (the plurality of first wiring electrodes X1 and the plurality of second wiring electrodes Y1) by a relative arrangement relationship between the movable electrode 37*b* and the plurality of sensor electrodes.

(5) Aspects

As can be seen from the embodiment and variations described above, the present specification describes the following aspects.

An adherend-equipped substrate (1) of a first aspect includes a substrate (2) and an adherend (3). The adherend (3) is bonded to a front face (2*s*) of the substrate (2) with an adhesive (4). The substrate (2) includes a substrate body (21) and a protective layer (23). The protective layer (23) having a front face (23*s*) is disposed at a side of a front face (21*s*) of the substrate body (21). The front face (23*s*) of the protective layer (23) includes a first region (23*a*) and a second region (23*b*). The first region (23*a*) is a region to which the adherend (3) is bonded with the adhesive (4), the first region (23*a*) having a first contact angle. The second region (23*b*) is a region other than the first region (23*a*) and has a second contact angle. The first contact angle is smaller than the second contact angle.

With this configuration, the first contact angle of the first region (23*a*) is smaller than the second contact angle of the second region (23*b*) in the front face (23*s*) of the protective layer (23). Thus, a large number of local air layers (4*a*) can be suppressed from being mixed in an adhesive layer formed from the adhesive (4) when the adhesive (4) is applied to the first region (23*a*). As a result, the adherend (3) can be firmly bonded to the first region (23*a*) of the front face (23*s*) of the protective layer (23) with the adhesive (4).

An adherend-equipped substrate (1) of a second aspect referring to the first aspect, the first contact angle is smaller than or equal to 90 degrees.

With this configuration, the large number of local air layers (4*a*) can be suppressed from being mixed in the adhesive layer formed from the adhesive (4) in the first region (23*a*). As a result, the adherend (3) can be further firmly bonded to the first region (23*a*) of the protective layer (23) with the adhesive (4).

In an adherend-equipped substrate (1) of a third aspect referring to the first or second aspect, the front face (23*s*) of the protective layer (23) has a processed level difference (D1) such that the first region (23*a*) is stepped lower than the second region (23*b*). The processed level difference (D1) is smaller than a thickness of the protective layer (23) in the second region (23*b*).

This configuration has the processed level difference (D1) between the first region (23*a*) and the second region (23*b*), thereby preventing a layer underlying the protective layer (23) from being exposed in the first region (23*a*) of the protective layer (23) and from being cut. As a result, without influencing the layer underlying the protective layer (23) (e.g., without impairing the function of the layer underlying the protective layer (23)), the adherend (3) can be firmly bond to the first region (23*a*) of the protective layer (23) with the adhesive (4).

In an adherend-equipped substrate (1) of a fourth aspect referring to any one of the first to third aspects, the substrate body (21) is a glass substrate.

With this configuration, when the substrate body (21) is the glass substrate, the adherend (3) can be firmly bonded to the first region (23*a*) of the front face (23*s*) of the protective layer (23) with the adhesive (4).

An adherend-equipped substrate (1) of a fifth aspect referring to the fourth aspect further includes a glass reinforcement layer (22) disposed between the substrate body (21) and the protective layer (23).

With this configuration, when the substrate body (21) is the glass substrate, the glass reinforcement layer (22) can reinforce the substrate body (21) (the glass substrate).

In an adherend-equipped substrate (1) of a sixth aspect referring to any one of the first to fifth aspects, the protective layer (23) is a soil-resistant layer configured to suppress soil from adhering to a front face of a layer underlying the protective layer (23).

With this configuration, when the protective layer (23) is the soil-resistant layer, the adherend (3) can be firmly bonded to the first region (23*a*) of the front face (23*s*) of the protective layer (23) with the adhesive (4).

In an adherend-equipped substrate (1) of a seventh aspect referring to the sixth aspect, the protective layer (23) is a fluororesin, silicone, or fluorine denatured silane.

With this configuration, when the protective layer (23) is fluororesin, silicone, or fluorine denatured silane, the adherend (3) can be firmly bonded to the first region (23*a*) of the front face (23*s*) of the protective layer (23) with the adhesive (4).

An adherend-equipped substrate (1) of an eighth aspect referring to any one of the first to seventh aspects further includes a touch panel sensor (6). The touch panel sensor (6) is disposed on a rear face (2*b*) of the substrate (2). The touch panel sensor (6) includes a plurality of sensor electrodes (X1, Y1) for detecting a touch position on the front face (2*s*) of the substrate (2) by an operator. The adherend (3) is an input device (3) configured to receive an operation given by the operator. The input device (3) includes an operation unit (30) and a counter electrode (8). The operation unit (30) is configured to be displaced in accordance with the operation given by the operator. The counter electrode (8) faces at least one of the plurality of sensor electrodes (X1, Y1), and an electrical state of the counter electrode (8) changes as the operation unit (30) is displaced.

With this configuration, the input device (3) can be firmly bonded to the front face (2*s*) of the substrate (2) disposed on the front face (6*s*) of the touch panel sensor (6) with the adhesive (4)

In an adherend-equipped substrate (1) of a ninth aspect referring to the eighth aspect, the counter electrode (8) of the input device (3) includes a first fixed electrode (39*a*, 39*b*, 39*d*) and a second fixed electrode (39*c*) which are bonded to the first region (23*a*) of the front face (2*s*) of the substrate (2) with the adhesive (4). The input device (3) further includes a movable electrode (37*b*). The movable electrode (37*b*) is configured to move together with the operation unit (30) to electrically connect and disconnect the first fixed electrode (39*a*, 39*b*, 39*d*) to the second fixed electrode (39*c*).

With this configuration, the input device (3) includes the first fixed electrode (39*a*, 39*b*, 39*d*), the second fixed electrode (39*c*), and the movable electrode (37*b*), thereby firmly bonding the input device (3), with the adhesive (4), to the front face (2*s*) of the substrate (2) disposed on the front face (6*s*) of the touch panel sensor (6).

In an adherend-equipped substrate (1) of a tenth aspect referring to the eighth or ninth aspect, each of the plurality of sensor electrodes (X1, Y1) is configured to be capacitively coupled to the counter electrode (8) which the each of the plurality of sensor electrodes (X1, Y1) faces to output an output voltage according to a change in an electrostatic capacitance value of the counter electrode (8).

With this configuration, the counter electrode (8) of the input device (3) and at least one of the plurality of sensor electrodes (X1, Y1) of the touch panel sensor (6) are capacitively coupled. In the adherend-equipped substrate (1), almost no local air layer (4*a*) is mixed in the adhesive layer bonding the input device (3) to the protective layer (23) as described above. This suppresses the local air layers (4*a*) from inhibiting the capacitive coupling between the counter electrode (8) and the sensor electrode (X1, Y1). As a result, the touch panel sensor (6) can detect well the operation given to the operation unit (30) of the input device (3).

In an adherend-equipped substrate (1) of an eleventh aspect referring to any one of the eighth to tenth aspects, the first region (23*a*) encompasses the counter electrode (8) in plan view in a direction orthogonal to the front face (23*s*) of the protective layer (23).

With this configuration, the entirety of the counter electrode (8) of the input device (3) can be bonded to the first region (23*a*) of the protective layer (23) with the adhesive (4). As a result, the input device (3) can be firmly bonded to the first region (23*a*).

REFERENCE SIGNS LIST

- 1 Adherend-Equipped Substrate
- 2 Cover Lens (Substrate)
- 2*s* Front Face
- 3 Input Device (Adherend)
- 4 Adhesive

6 Touch Panel Sensor
6*s* Front Face
8 Counter Electrode
21 Substrate Body
21*s* Front Face
22 Glass Reinforcement Layer
22*s* Front Face
23 Protective Layer
23*a* First Region
23*b* Second Region
23*s* Front Face
30 Operation Unit
37*b* Movable Electrode
39*a*, 39*b*, 39*d* First Fixed Electrode
39*c* Second Fixed Electrode
D1 Processed Level Difference
X1 First Wiring Electrode (Sensor Electrode)
Y1 Second Wiring Electrode (Sensor Electrode)

The invention claimed is:

1. An adherend-equipped substrate comprising:
a substrate; and
an adherend bonded to a front face of the substrate with an adhesive,
the substrate including
a substrate body and
a protective layer having a front face disposed at a side of a front face of the substrate body,
the front face of the protective layer including
a first region which is a region to which the adherend is bonded with the adhesive, the first region having a first contact angle, and
a second region which is a region other than the first region, the second region having a second contact angle,
the first contact angle being smaller than the second contact angle.

2. The adherend-equipped substrate of claim 1, wherein
the first contact angle is smaller than or equal to 90 degrees.

3. The adherend-equipped substrate of claim 1, wherein
the front face of the protective layer has a processed level difference such that the first region is stepped lower than the second region, and
the processed level difference is smaller than a thickness of the protective layer in the second region.

4. The adherend-equipped substrate of claim 1, wherein
the substrate body is a glass substrate.

5. The adherend-equipped substrate of claim 4, further comprising a glass reinforcement layer disposed between the substrate body and the protective layer.

6. The adherend-equipped substrate of claim 1, wherein
the protective layer is a soil-resistant layer configured to suppress soil from adhering to a front face of a layer underlying the protective layer.

7. The adherend-equipped substrate of claim 6, wherein
the protective layer is a fluororesin, silicone, or fluorine denatured silane.

8. The adherend-equipped substrate of claim 1, further comprising a touch panel sensor disposed on a rear face of the substrate and including a plurality of sensor electrodes for detecting a touch position on the front face of the substrate by an operator, wherein:
the adherend is an input device configured to receive an operation given by the operator; and
the input device includes:
a case,
an operation unit attached to the case and displaceable with respect to the case in accordance with the operation given by the operator,
a movable electrode attached to the case and movable together with the operation unit, and
a counter electrode assembly fixed on a rear face of the case and at least one counter electrode of the counter electrode assembly facing at least one sensor electrode of the plurality of sensor electrodes, an electrical state of the counter electrode assembly changeable based on a displacement of the operation unit, the counter electrode assembly including a plurality of first fixed electrodes, and including a second fixed electrode, such that movement of the moveable electrode electrically connects and disconnects a first fixed electrode of the plurality to the second fixed electrode.

9. The adherend-equipped substrate of claim 8, wherein
the plurality of first fixed electrodes and the second fixed electrode are bonded to the first region of the front face of the substrate with the adhesive.

10. The adherend-equipped substrate of claim 8, wherein
each sensor electrode of the plurality of sensor electrodes is configured to face and be capacitively coupled to a counter electrode of the counter electrode assembly to output an output voltage according to a change in an electrostatic capacitance value of the counter electrode.

11. The adherend-equipped substrate of claim 8, wherein
the first region encompasses the counter electrode assembly in plan view in a direction orthogonal to the front face of the protective layer.

* * * * *